(12) United States Patent
Wu et al.

(10) Patent No.: US 12,467,839 B2
(45) Date of Patent: Nov. 11, 2025

(54) BENDING TEST DEVICE

(71) Applicant: KUNSHAN GO-VISIONOX OPTO-ELECTRONICS CO., LTD, Jiangsu (CN)

(72) Inventors: Xiangli Wu, Kunshan (CN); Xingxing Yang, Kunshan (CN)

(73) Assignee: KUNSHAN GO-VISIONOX OPTO-ELECTRONICS CO., LTD, Kunshan (CN)

( * ) Notice: Subject to any disclaimer, the term of this patent is extended or adjusted under 35 U.S.C. 154(b) by 569 days.

(21) Appl. No.: 17/375,313

(22) Filed: Jul. 14, 2021

(65) Prior Publication Data

US 2021/0341366 A1 Nov. 4, 2021

Related U.S. Application Data

(63) Continuation of application No. PCT/CN2019/124613, filed on Dec. 11, 2019.

(30) Foreign Application Priority Data

Jun. 29, 2019 (CN) .......................... 201910582486.7

(51) Int. Cl.
*G01N 3/20* (2006.01)
(52) U.S. Cl.
CPC ...................... *G01N 3/20* (2013.01)
(58) Field of Classification Search
CPC .......................... G01N 3/22; G01N 2203/0023
See application file for complete search history.

(56) References Cited

U.S. PATENT DOCUMENTS

| 5,505,091 A | * | 4/1996 | Ali | ........................ | G01M 5/005 |
| | | | | | 73/714 |
| 2019/0154555 A1 | * | 5/2019 | Han | ........................ | G01N 3/04 |
| 2020/0400541 A1 | * | 12/2020 | Levesque | ................. | G01N 3/20 |

FOREIGN PATENT DOCUMENTS

| CN | 105388645 A | 3/2016 |
| CN | 106226169 A | 12/2016 |
| CN | 106875849 A | 6/2017 |
| CN | 107014700 A | 8/2017 |
| CN | 107631861 A | 1/2018 |
| CN | 107941629 A | 4/2018 |
| CN | 108225938 A | 6/2018 |
| CN | 207717930 U | 8/2018 |
| CN | 108593471 A | 9/2018 |
| CN | 108877608 A | 11/2018 |
| CN | 208937318 U | 6/2019 |

(Continued)

OTHER PUBLICATIONS

Jiang et al., A Bending Test Jig of Flexible Display Screen, Jun. 2017, FIT Machine Translation (Year: 2017).*

(Continued)

*Primary Examiner* — Erika J. Villaluna
(74) *Attorney, Agent, or Firm* — Maier & Maier, PLLC

(57) ABSTRACT

A bending test device. The bending test device includes a base and at least one carrier component disposed on the base, where each of the at least one carrier component includes a horizontal fixed portion and two moving portions rotatably connected to two sides of the horizontal fixed portion respectively, and each of the two moving portions has motion freedom to turn up and down relative to the horizontal fixed portion.

15 Claims, 7 Drawing Sheets

(56) References Cited

FOREIGN PATENT DOCUMENTS

| CN | 110296900 | A | | 10/2019 | | |
|---|---|---|---|---|---|---|
| IN | 109142112 | A | | 1/2019 | | |
| JP | 06142941 | A | * | 5/1994 | ............... | B22F 9/04 |
| KR | 20150139135 | A | * | 12/2015 | | |
| KR | 20180000130 | A | | 1/2018 | | |
| KR | 20190005302 | A | | 1/2019 | | |
| KR | 101965764 | B1 | | 4/2019 | | |

OTHER PUBLICATIONS

Lee et al. (KR 2015-0139135 A), Test Apparatus of Flexible Device, Dec. 2015, FIT Machine Translation (Year: 2015).*
International Search Report issued on Mar. 27, 2020 in corresponding International Application No. PCT/CN2019/124613; 4 pages.
Search Report issued on Apr. 2, 2020 in corresponding Chinese Application No. 201910582486.7; 2 pages.
First Office Action issued on Apr. 10, 2020 in corresponding Chinese Application No. 201910582486.7; 12 pages; Machine translation attached.
Second Office Action issued on Oct. 23, 2020 in corresponding Chinese Application No. 201910582486.7; 10 pages; Machine translation attached.
Third Office Action issued on Apr. 25, 2021 in corresponding Chinese Application No. 201910582486.7; 11 pages; Machine translation attached.

* cited by examiner

BENDING TEST DEVICE

CROSS-REFERENCE TO RELATED APPLICATIONS

This is a continuation of International Patent Application No. PCT/CN2019/124613, filed Dec. 11, 2019, which claims priority to Chinese Patent Application No. 201910582486.7, filed Jun. 29, 2019, the disclosures of which are incorporated herein by reference in their entireties.

FIELD

The present application relates to the technical field of test devices, for example, to a bending test device of a flexible sample.

BACKGROUND

A flexible display apparatus is a pliable display apparatus or a bendable flexible display apparatus, such as a flexible wearable product. The flexible display apparatus has good portability and is convenient to use in any place, and can bring subversive use experience to users.

Bending reliability is a key parameter to measure performance of a flexible product. Before the flexible product is shipped, a bending test needs to be performed on the flexible product. A current bending test device is capable of performing a book-turning bending test and a hinge bending test. However, the above bending test device cannot effectively perform a bending test on a wing bending product such as a flexible wearable device.

SUMMARY

The present application provides a bending test device which effectively tests the bending reliability of a wing bending sample.

An embodiment of the present application provides a bending test device.

The bending test device includes a base and at least one carrier component disposed on the base, where each of the at least one carrier component includes a horizontal fixed portion and two moving portions rotatably connected to two sides of the horizontal fixed portion respectively, and each of the two moving portions has motion freedom to turn up and down relative to the horizontal fixed portion.

The bending test device further includes a support component.

The support component is vertically disposed on the base, where one end of the support component is connected to the horizontal fixed portion of the carrier component, and the other end of the support component is connected to the base; and each of the two moving portions of the carrier component is capable of rotating around a respective rotation shaft connected between the horizontal fixed portion and each of the two moving portions and rotating to a side adjacent to the support component.

The bending test device further includes a motor and linkage components connected to the motor, where each of the linkage components is fixedly connected to a respective one of the two moving portions of the carrier component, each of the linkage components is configured to be driven by the motor to rotate around an axis of an output shaft of the motor, and each of the two moving portions of the carrier component is configured to be driven by a respective one of the linkage components to turn up and down around a respective rotation shaft connected between each of the two moving portions and the horizontal fixed portion.

The bending test device further includes a control component.

The control component, the carrier component, the motor and the linkage components each are disposed on the base, and the control component is configured to adjust bending of the two moving portions of the carrier component relative to the horizontal fixed portion of the carrier component.

The control component is configured to, according to a set bending parameter, adjust a bending angle and bending times of the two moving portions of the carrier component relative to the horizontal fixed portion of the carrier component, where the bending parameter includes a bending speed, a bending radius and bending times.

The bending test device provided by the present application includes at least one carrier component, where the carrier component includes the horizontal fixed portion and the two moving portions rotatably connected to the two sides of the horizontal fixed portion respectively, and the moving portion has motion freedom to turn up and down relative to the horizontal fixed portion. The bending test device has a consistent bending path with a terminal product, effectively testing the bending reliability of the wing bending sample.

DETAILED DESCRIPTION

Figure 1:
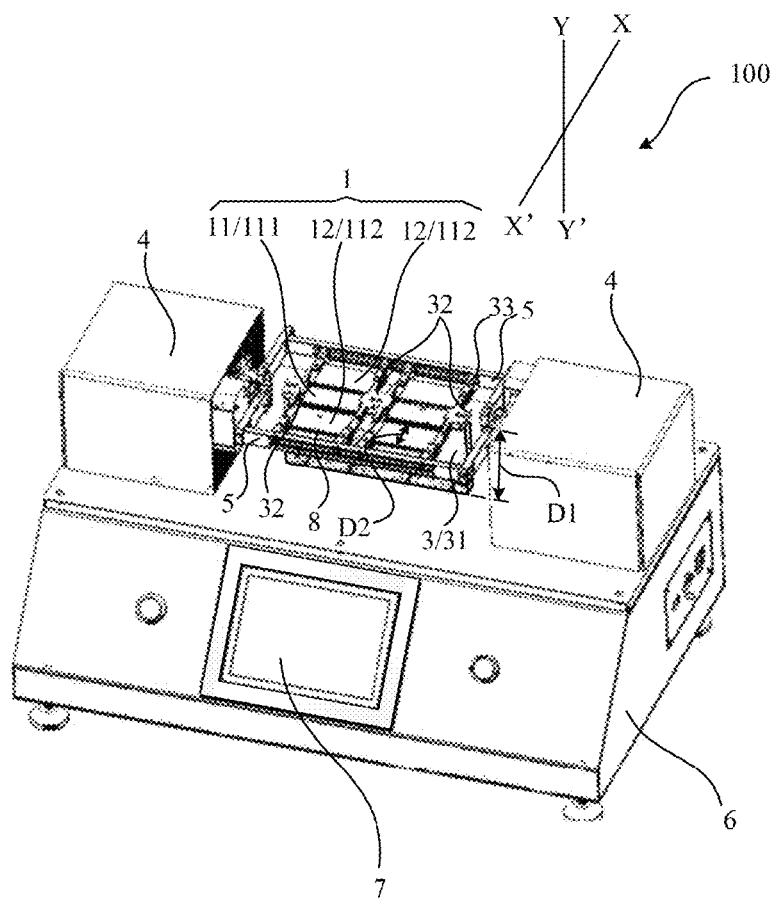
FIG. 1 is a structural diagram of a bending test device according to an embodiment of the present application.
Figure 2:
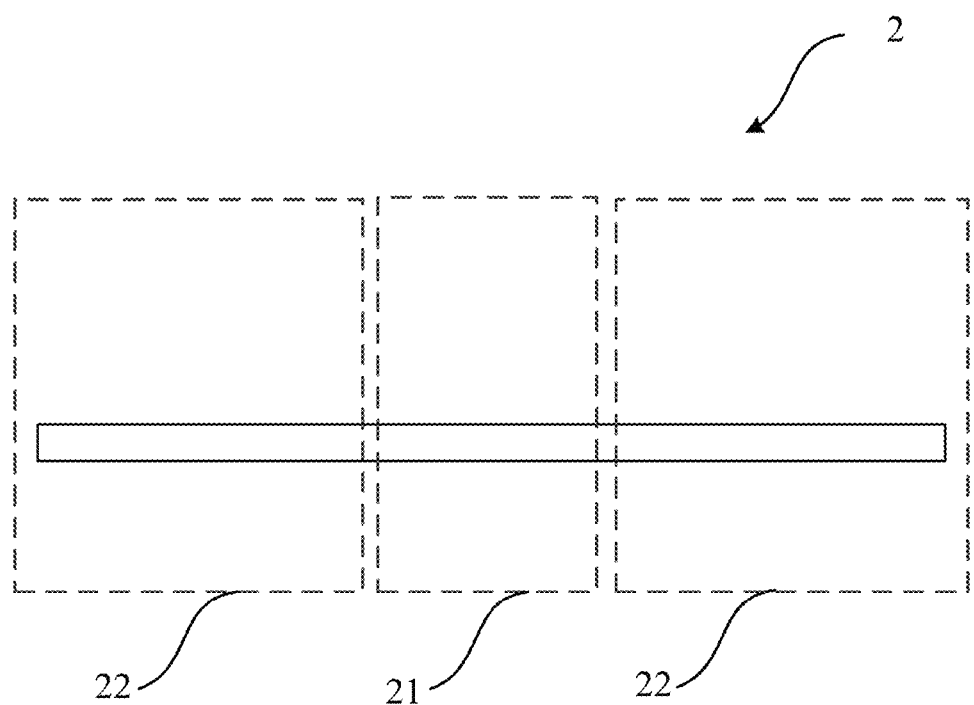
FIG. 2 is a structural diagram of a flexible sample in an original state according to an embodiment of the present application.
Figure 3:
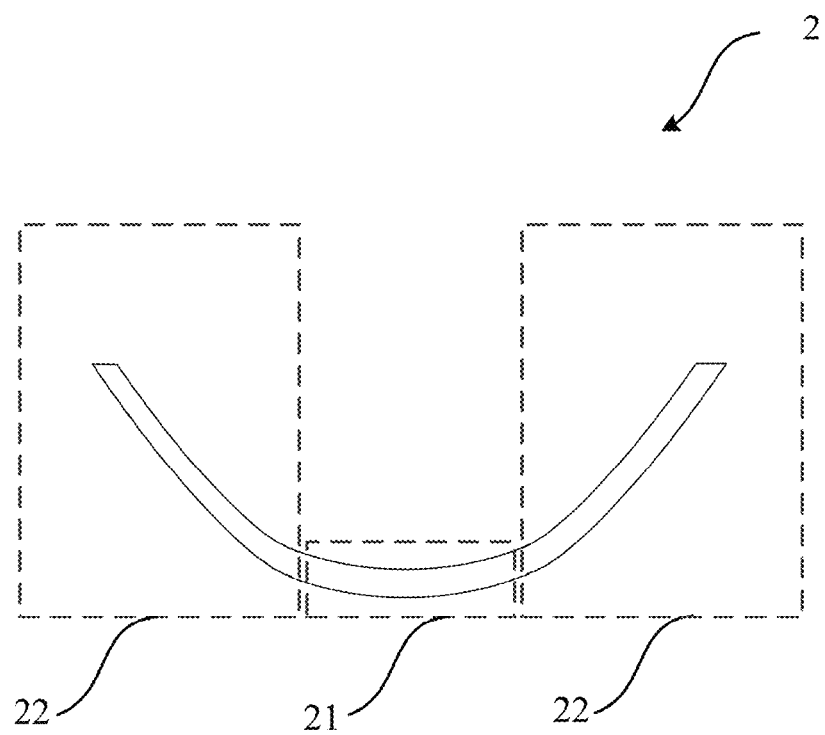
FIG. 3 is a structural diagram of a flexible sample in a medium bending state according to an embodiment of the present application.
Figure 4:
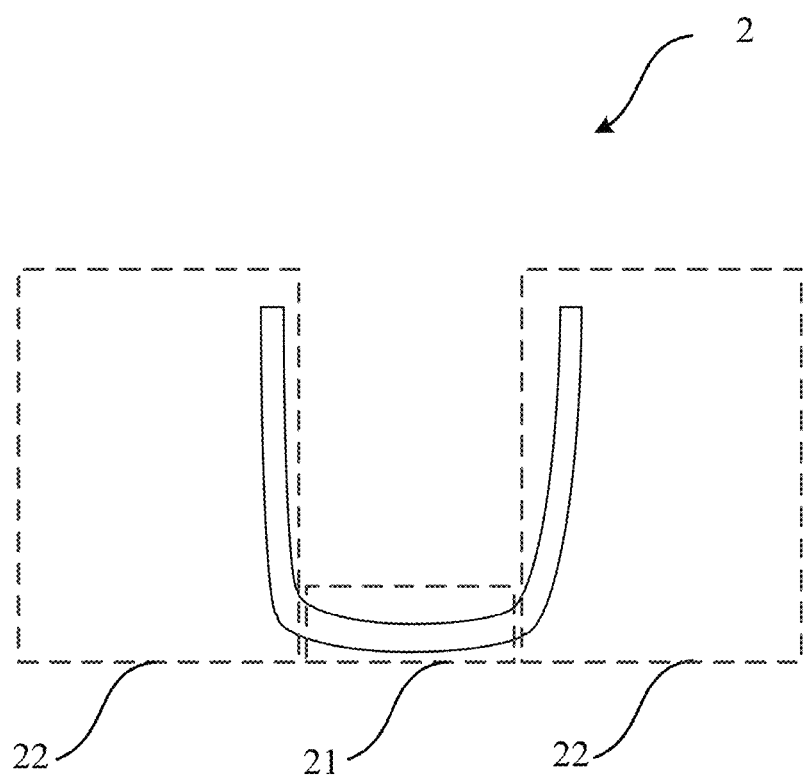
FIG. 4 is a structural diagram of a flexible sample in a vertical bending state according to an embodiment of the present application.

The present application is further described below in detail in conjunction with the drawings and embodiments. FIG. 1 is a structural diagram of a bending test device according to an embodiment of that present application, FIG. 2 is a structural diagram of a flexible sample in an original state according to an embodiment of the present application, FIG. 3 is a structural diagram of a flexible sample in a medium bending state according to an embodiment of the present application, and FIG. 4 is a structural diagram of a flexible sample in a vertical bending state according to an embodiment of the present application.

In conjunction with FIGS. 1 to 4, a bending test device 100 includes at least one carrier component 1. FIG. 1 exemplarily illustrates that the bending test device 100 includes two carrier components 1. The flexible sample is disposed on one carrier component 1. The carrier component 1 includes a horizontal fixed portion 11 and two moving portions 12 rotatably connected to two sides of the horizontal fixed portion 11 respectively, and the moving portion 12 has motion freedom to turn up and down relative to the horizontal fixed portion 11, that is, the moving portion 12 can turn up and down relative to the horizontal fixed portion 11.

Figure 6:
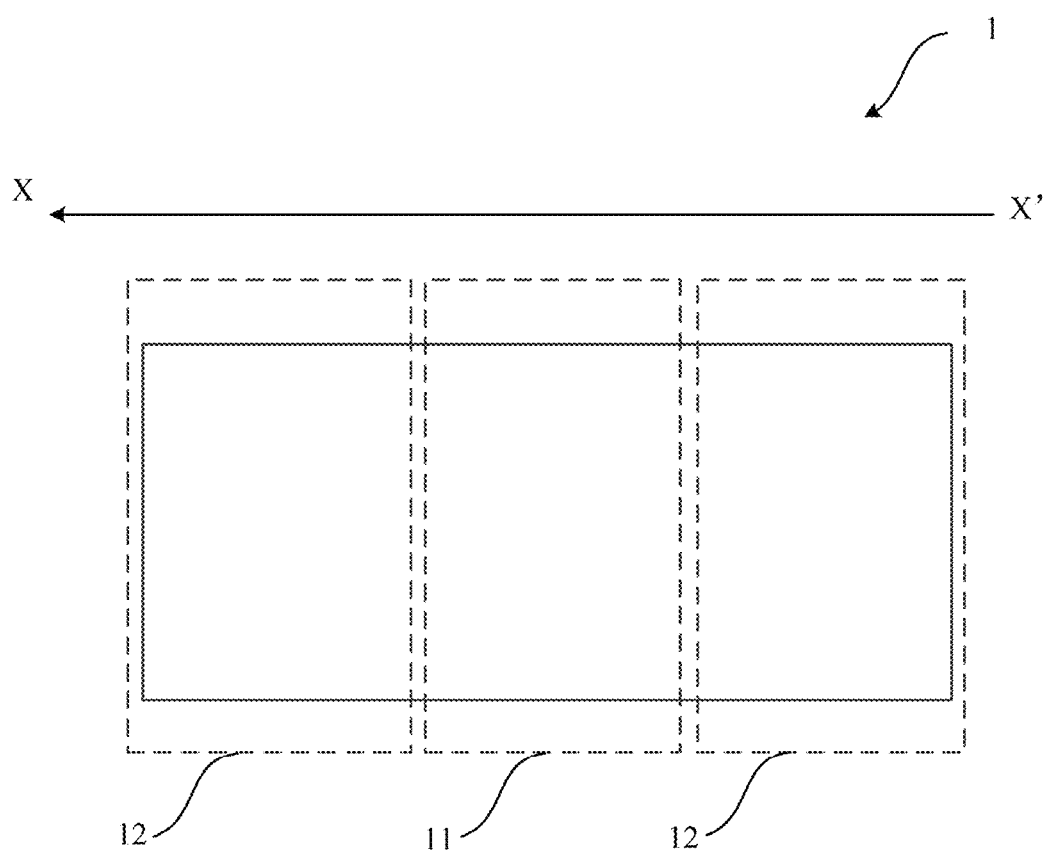
FIG. 6 is a structural diagram of a carrier component of a bending test device according to an embodiment of the present application.
Figure 7:
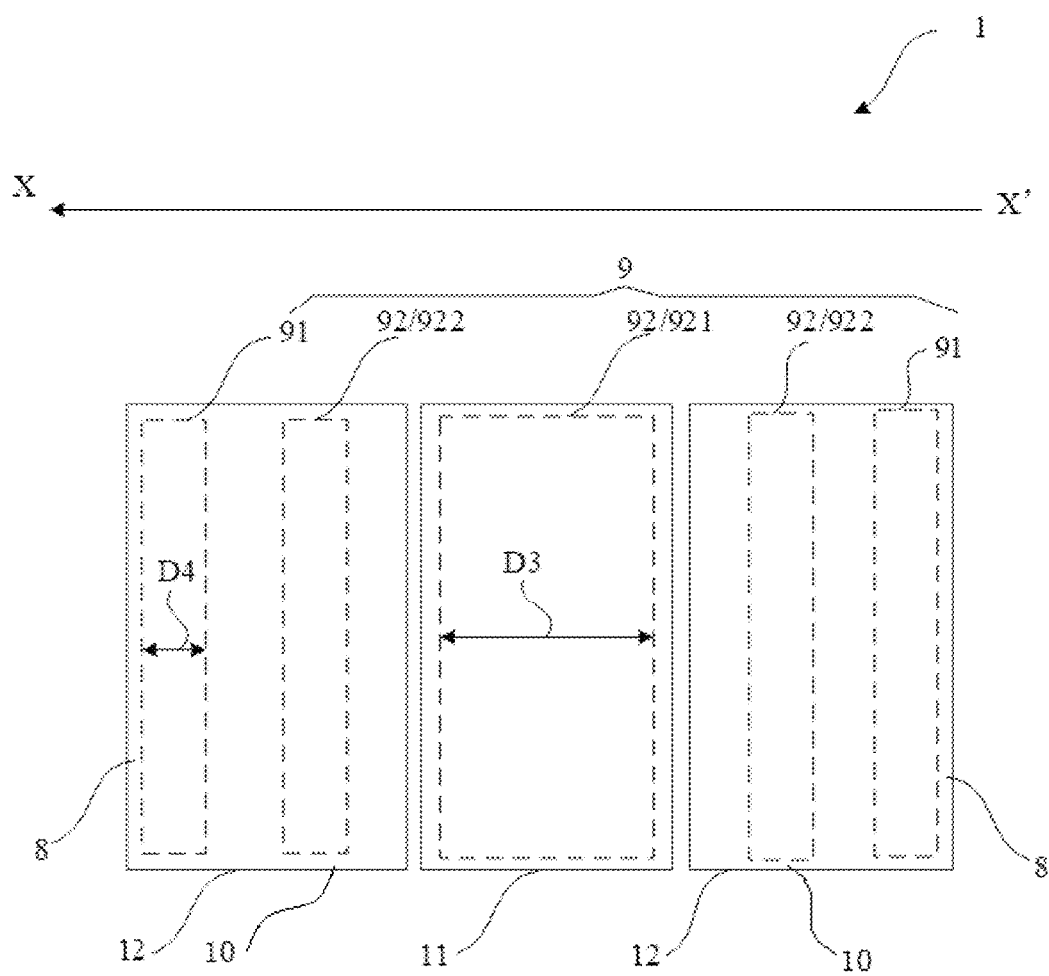
FIG. 7 is a structural diagram of another carrier component of a bending test device according to an embodiment of the present application.

Herein, a direction, which is in a horizontal plane of the bending test device and perpendicular to an axis of a rotation shaft connected between the horizontal fixed portion 11 and the moving portion 12, is defined as a first direction, that is, a direction XX' shown in FIGS. 1, 6 and 7. A direction perpendicular to the horizontal plane of the bending test device is defined as a second direction, that is, a direction YY' in FIG. 1.

In conjunction with FIGS. 1 to 4, it may be set that the flexible sample 2 includes a non-bent portion 21 and bent portions 22 located on two sides of the non-bent portion 21, respectively. The non-bent portion 21 of the flexible sample 2 is fixed to the horizontal fixed portion 11 of the carrier component 1, and the bent portions 22 of the flexible sample 2 are fixed respectively to the moving portions 12 of the corresponding carrier component 1, that is, one bent portion 22 of the flexible sample 2 is fixed to one moving portion 12 of the carrier component 1, and the other bent portion 22 of the flexible sample 2 is fixed to the other moving portion 12 of the carrier component 1. The moving portion 12 of the carrier component 1 turns up and down around a rotation shaft connected between the moving portion 12 and the horizontal fixed portion 11, so as to bend the bent portion 22 of the flexible sample 2 fixed on the carrier component 1.

It is to be noted that the number of flexible samples 2 that can be disposed on one carrier component 1 and the number of carrier components 1 included in one bending test device 100 are not specifically limited in the embodiments of the present application. For example, two carrier components 1 may be arranged in parallel in a direction perpendicular to the first direction in the horizontal plane of the bending test device, so as to simultaneously test the two flexible samples 2.

The bending test device may perform a book-turning bending test and a hinge bending test. The book-turning bending test is a bending manner to fix one side of the flexible sample and turn the other side back and forth relative to the fixed side. The hinge bending test is a bending manner to fix two sides of the flexible sample on two flat plates, pull the middle of the flexible sample down, and then the two sides of the flexible sample are gathered towards the middle. A bending radius of a bent region may be controlled by adjusting a distance between the two flat plates after bending. However, such a bending test device cannot effectively perform a bending test on a wing bending product such as a flexible wearable device.

In conjunction with FIGS. 1 to 4, the carrier component 1 includes the horizontal fixed portion 11 and the two moving portions 12 rotatably connected to the two sides of the horizontal fixed portion 11, respectively, such that the non-bent portion 21 of the flexible sample 2 is fixed to the horizontal fixed portion 11 of the carrier component 1 and the bent portions 22 of the flexible sample 2 are fixed to the moving portions 12 of the carrier component 1. During the process in which the moving portions 12 of the carrier component 1 turn up and down, the non-bent portion 21 of the flexible sample 2 is fixed to the horizontal fixed portion 11 of the carrier component 1 and remains still and the bent portions 22 of the flexible sample 2 turn up and down along with the moving portions 12 of the carrier component 1 relative to the horizontal fixed portion 11 of the carrier component 1. That is, driven by the carrier component 1, the bent portions 22 of the flexible sample 2 located on the two sides of the non-bent portion 21 can turn up and down relative to the non-bent portion 21. Referring to FIGS. 2 to 4, driven by the carrier component 1, the bent portions 22 of the flexible sample 2 located on the two sides of the non-bent portion 21 can turn up from the original state shown in FIG. 2 to the medium state shown in FIG. 3 and then to the vertical bending state shown in FIG. 4 relative to the non-bent portion 21, thereby simulating the bending path of a wing bending sample such as the flexible wearable device in actual use to the greatest extent. The wing bending sample is, for example, a wearable smart watch in which a middle dial region is fixed and watchbands on two sides are bent along a direction perpendicular to a dial, effectively testing the bending reliability of the wing bending sample.

Optionally, as shown in FIG. 1, the bending test device 100 further includes a support component 3 vertically disposed along the second direction. One end of the support component 3 is connected to one side of the horizontal fixed portion 11 of the carrier component 1, and the other end of the support component 3 is connected to a base 6. At this time, the moving portions 12 of the carrier component 1 may turn down to a side adjacent to the support component 3.

The support component 3 provided by this embodiment includes a support plate 31 and fixing components 32. The fixing components 32 are configured to fix the horizontal fixed portion 11 of the carrier component 1 to the support component 3. For example, it may be set that the fixing components 32 are not only fixedly connected to the support plate 31 but also fixedly connected to the carrier component 1, so as to fix the horizontal fixed portion 11 of the carrier component 1 to the support component 3.

As shown in FIG. 1, the bending test device provided by this embodiment may include two carrier components 1. Two sides of the horizontal fixed portion 11 of each carrier component 1 are both supported by the vertically disposed support plate 31, the horizontal fixed portions 11 of the two carrier components 1 are both disposed at the upper end of the support plate 31, the support plate 31 supports the horizontal fixed portions 11 of the two carrier components 1, and the fixing components 32 fix the horizontal fixed portions 11 of the two carrier components 1 to the support component 3. The flexible sample 2 is disposed above the carrier component 1. The moving portion 12 of the carrier component 1 turns up and down around the rotation shaft connected between the moving portion 12 and the horizontal fixed portion 11, so as to drive the bent portion 22 of the flexible sample 2 to turn to the side adjacent to the support component 3. At this time, since the support component 3 provides sufficient motion space for the moving portion 12 of the carrier component 1, the configuration of the support component 3 also enables the moving portion 12 of the carrier component 1 to turn down.

Optionally, a height D1 of the support component 3 along the second direction is greater than a length D2 of the moving portion 12 of the carrier component 1 along the first direction, and it may be set that the length D2 of each of the two moving portions 12 of the carrier component 1 along the first direction is less than the height D1 of the support component 3 along the second direction. When the two moving portions 12 of the carrier component 1 turn down, the sides of the two moving portions 12 along the first direction are enabled to be infinitely close to the corresponding sides of the support component 3 along the second direction respectively, so as to achieve maximum turning. In an embodiment, if the height D1 of the support component 3 along the second direction is less than the length D2 of the moving portion 12 of the carrier component 1 along the first direction, the moving portion 12 of the carrier component 1 will be blocked by a horizontal plane of the base 6 before turning down to 90°, affecting an angle to which the moving portion 12 of the carrier component 1 turns down. In the embodiments of the present application, the height D1 of the support component 3 along the second direction is greater than the length D2 of the moving portion 12 of the carrier component 1 along the first direction so that when the moving portion 12 of the carrier component 1 turns to the side of the carrier component 1 adjacent to the support component 3, a turning angle may not be limited by the base 6 at the lower end of the support component 3, which facilitates an increase of the turning angle of the moving portion 12 of the carrier component 1, that is, can test a greater turning angle of the bent portion 22 of the flexible sample 2 disposed on the carrier component 1.

In this embodiment, when another structure is provided on a side of the moving portion 12 facing away from the horizontal fixed portion 11, the height D1 of the support component 3 along the second direction is greater than a sum of the length D2 of the moving portion 12 of the carrier component 1 along the first direction and a length of the another structure along the first direction, so as to ensure that the turning angle of the moving portion 12 of the carrier component 1 along with the other structure is not limited by the horizontal plane at the lower end of the support component 3.

As shown in FIG. 1, in this embodiment, it may be set that a width of the support component 3 along the first direction is less than a width of the horizontal fixed portion 11 along the first direction.

In conjunction with FIGS. 1 to 4, when the width of the support component 3 along the first direction is greater than the width of the horizontal fixed portion 11 along the first direction, during the process in which the moving portion 12 of the carrier component 1 turns down, the moving portion 12 of the carrier component 1 will be blocked by the support component 3 before bending down to 90° due to too large width of the support component 3 along the first direction, affecting the angle to which the moving portion 12 of the carrier component 1 turns down. Therefore, in this embodiment, the width of the support component 3 along the first direction is less than the width of the horizontal fixed portion 11 along the first direction, so as to provide sufficient motion space for the moving portion 12 of the carrier component 1 to turn. In this way, the moving portion 12 of the carrier component 1 can turn down to 90° or even an angle greater than 90°.

Figure 5:
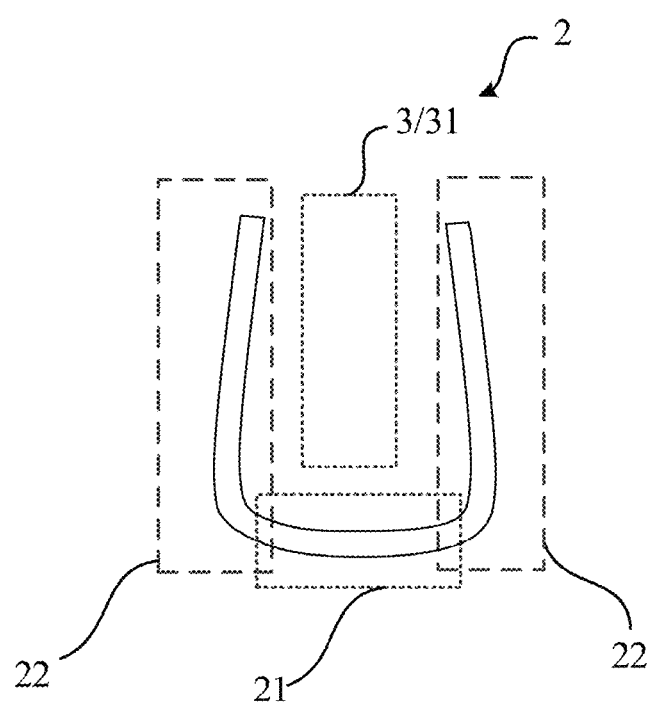
FIG. 5 is a structural diagram of a flexible sample in a bending state according to an embodiment of the present application.

As shown in FIG. 5, the width of the support component 3 along the first direction is less than the width of the horizontal fixed portion 11 along the first direction, and the height D1 of the support component 3 along the second direction is greater than the length D2 of the moving portion 12 of the carrier component 1 along the first direction, thereby increasing the angle to which the moving portion 12 of the carrier component 1 turns down and testing the greater turning angle of the bent portion 22 of the flexible sample 2 disposed on the carrier component 1.

The bending test device provided by this embodiment may further include a sample fixing member. The sample fixing member may be any one of a magnetic fixing member, an adhesive fixing member or a press-attach fixing member. In conjunction with FIGS. 1 to 5, the flexible sample 2 is fixed to the carrier component 1 by the sample fixing member. In the case where the sample fixing member is the magnetic fixing member, the magnetic fixing member may be separately disposed on surfaces of the horizontal fixed portion 11 and the moving portions 12 of the carrier component 1 facing towards the support component 3, and surfaces of the non-bent portion 21 and the bent portions 22 of the flexible sample 2 facing away from the carrier component 1, so that the non-bent portion 21 of the flexible sample 2 is fixed to the horizontal fixed portion 11 of the carrier component 1 and the bent portions 22 of the flexible sample 2 are fixed to the moving portions 12 of the carrier component 1 respectively through the magnetic adsorption force between magnetic fixing members on upper and lower sides. The magnetic fixing member achieves simple and flexible fixing.

In the case where the sample fixing member is the adhesive fixing member, the adhesive fixing member may be disposed on the lower surface of the flexible sample 2 facing towards the carrier component 1 and the upper surface of the carrier component 1 facing towards the flexible sample 2, separately, so that the non-bent portion 21 of the flexible sample 2 is fixed to the horizontal fixed portion 11 of the carrier component 1 and the bent portions 22 of the flexible sample 2 are fixed to the moving portions 12 of the carrier component 1 respectively through the adhesiveness of the adhesive fixing member. The adhesive fixing member achieves relatively firm fixing.

In the case where the sample fixing member is the press-attach fixing member, the press-attach fixing member may include mechanical structures such as a press strip and bolts. The press strip is disposed on the upper surface of the flexible sample 2 facing away from the carrier component 1 and punched, the carrier component 1 is also punched, and the bolts penetrate through the punching positions of the press strip and the punching positions of the carrier component 1, so as to fix the press strip to the carrier component 1 and then press the flexible sample 2 to the carrier component 1. That is, the non-bent portion 21 of the flexible sample 2 is fixed to the horizontal fixed portion 11 of the carrier component 1 and the bent portions 22 of the flexible sample 2 are fixed to the moving portions 12 of the carrier component 1 respectively. The press-attach fixing member achieves relatively firm fixing.

As shown in FIG. 1, the bending test device 100 provided by this embodiment further includes a motor 4 and linkage components 5 disposed in correspondence with the moving portions 12 of the carrier component 1 respectively. Each linkage component 5 is fixedly connected to a respective one of the moving portions 12 of the carrier component 1, and the linkage component 5 is driven by the motor 4 to rotate around an axis of an output shaft of the motor 4.

As shown in FIG. 1, the linkage component 5 may be a connecting rod, the motor 4 may be a servo motor, and the connecting rod may be fixedly connected to the corresponding moving portion 12 of the carrier component 1 through a fixing component 33. For example, one end of the fixing component 33 is fixedly connected to the connecting rod, and the other end of the fixing component 33 is fixedly connected to the moving portion 12, thereby achieving a fixed connection between the connecting rod and the moving portion 12. FIG. 1 exemplarily illustrates that the linkage components 5 are fixedly connected to their respective moving portions 12 of the carrier component 1 at the edges of the moving portions 12 facing away from the horizontal fixed portion 11 through the fixing components 33. This embodiment does not limit the positions at which the linkage components 5 are fixedly connected to the corresponding moving portions 12 of the carrier component 1 as long as the linkage components 5 can drive the corresponding moving portions 12 of the carrier component 1 to turn up and down.

Driven by the motor 4, the linkage component 5 rotates around the axis of the output shaft of the motor 4 so that the corresponding moving portion 12 of the carrier component 1 fixedly connected to the linkage component 5 turns up and down around the rotation shaft connected between the moving portion 12 and the horizontal fixed portion 11, so as to perform a bending test on the wing bending flexible sample 2. Driven by the linkage components 5, the moving portions 12 of the carrier component 1 can also turn up or down to an angle greater than 90°. For example, when the moving portions 12 turn up, the moving portions 12 of the carrier component 1 can turn up to an angle greater than 90° when two connecting rods come into contact directly above the horizontal fixed portion 11. When the moving portions 12 of the carrier component 1 turn down, the moving portions 12 of the carrier component 1 can turn down to an angle greater than 90° when the two connecting rods come into contact with the corresponding two sides of the support component 3.

In conjunction with FIGS. 1 to 5, the horizontal fixed portion 11 of the carrier component 1 may include a first carrier plate 111, and the moving portion 12 of the carrier component 1 may include a second carrier plate 112. The second carrier plate 112 is rotatably connected to the first carrier plate 111. In this embodiment, the first carrier plate 111 and the second carrier plate 112 may be planar plate structures.

The first carrier plate 111 is configured to carry the non-bent portion 21 of the flexible sample 2, the second carrier plate 112 is configured to carry the bent portion 22 of the flexible sample 2, and the bent portion 22 of the flexible sample 2 carried on the second carrier plate 112 rotates along with the second carrier plate 112 relative to the first carrier plate 111, that is, relative to the non-bent portion 21 of the flexible sample 2. The first carrier plate 111 and the second carrier plate 112 are rotatably connected through bearings or screws and latches so that the second carrier plates 112 on two sides of the first carrier plate 111 bend up and down relative to the first carrier plate 111 to a maximum bending angle greater than 90°, and the bending radius of the flexible sample 2 can be adjusted by adjusting angles to which the second carrier plates 112 on the two sides of the first carrier plate 111 bend up and down relative to the first carrier plate 111, thereby achieving a limit test of the flexible product 2. In this embodiment, the first carrier plate 111 and the second carrier plate 112 are made of an aluminum alloy material and their surfaces are galvanized. Since the first carrier plate 111 and the second carrier plate 112 are rotatably connected, the bending angle of the carrier component 1 is not limited by the materials of the first carrier plate 111 and the second carrier plate 112. The first carrier plate 111 may be made of the aluminum alloy material with a lower cost and higher hardness. The galvanized surface can prevent an aluminum alloy from being corroded.

FIG. 6 is a structural diagram of a carrier component of a bending test device according to an embodiment of the present application. In conjunction with FIGS. 2 to 6, the carrier component 1 may be an integral sheet structure, that is, the carrier component 1 in FIG. 1 may be made into the carrier component 1 with the integral sheet structure as shown in FIG. 6. The carrier component 1 provides a complete carrier plane, that is, the horizontal fixed portion 11 and the moving portions 12 of the carrier component 1 constitute the integral sheet structure. The carrier component 1 may adopt, for example, a steel sheet as the carrier component 1, the middle of the steel sheet may be fixedly used as the horizontal fixed portion 11 of the carrier component 1, and the steel sheet on two sides of the horizontal fixed portion 11 may turn up and down. The integral carrier component 1 may also drive the flexible sample 2 to achieve a wing bending test. The flexible sample 2 performs arc-like bending. The flexible sample 2 tested in this embodiment is applicable to arc-surfaced products such as water cups and umbrella handles.

FIG. 7 is a structural diagram of another carrier component of the bending test device according to this embodiment. In conjunction with FIGS. 1 to 5 and FIG. 7, by using the carrier component 1 composed of carrier plates as an example, the sample fixing member may be the adhesive fixing member 9, the adhesive fixing member 9 includes a body adhesive fixing member 92 and an edge adhesive fixing member 91, and the body adhesive fixing member 92 includes a first body adhesive fixing member 921 and a second body adhesive fixing member 922.

The non-bent portion 21 of the flexible sample 2 may be fixed to the horizontal fixed portion 11 of the carrier component 1 by the first body adhesive fixing member 921, and the bent portion 22 of the flexible sample 2 is fixed to the moving portion 12 of the carrier component 1 by the second body adhesive fixing member 922 and the edge adhesive fixing member 91. The edge adhesive fixing member 91 and the body adhesive fixing member 92 extend in a direction perpendicular to the first direction in the horizontal plane of the bending test device.

The body adhesive fixing member 92 and the edge adhesive fixing member 91 both extend in the direction perpendicular to the first direction in the horizontal plane of the bending test device so that various adhesive structures extend in a direction perpendicular to the direction in which the flexible sample 2 bends. Thus, during the process in which the flexible sample 2 is driven by the carrier component 1 to bend, the non-bent portion 21 and the bent portions 22 of the flexible sample 2 are firmly adhered to the corresponding positions of the carrier component 1 and the non-bent portion 21 and the bent portions 22 of the flexible sample 2 disposed at the positions of the adhesive structures are still relative to the corresponding positions of the carrier component 1, making the bending of the flexible sample 2 closer to wing turning.

In conjunction with FIGS. 1 to 5 and FIG. 7, it may be set that one bent portion 22 of the flexible sample 2 is fixed to the moving portion 12 of the carrier component 1 by at least two adhesive fixing members, for example, one second body adhesive fixing member 922 and one edge adhesive fixing member 91, where the second body adhesive fixing member 922 and the edge adhesive fixing member 91 are arranged along the first direction and the edge adhesive fixing member 91 is adhered to a first position 8 of the bent portion 22 of the flexible sample 2. The position 8 is an edge position of the bent portion 22 of the flexible sample 2 away from the non-bent portion 21 of the flexible sample 2 along the first direction.

In this embodiment, during the bending test on each bent portion 22 of the flexible sample 2, at least two adhesive fixing members are arranged between the flexible sample 2 and the carrier component 1, for example, each bent portion 22 is firmly fixed to the moving portion 12 of the carrier component 1 by one second body adhesive fixing member 922 and one edge adhesive fixing member 91. The first position 8 of the bent portion 22 of the flexible sample 2 is adhered to an edge position of the moving portion 12 of the carrier component 1 by the edge adhesive fixing member 91, so as to ensure that the bent portion 22 of the flexible sample 2 is reliably and fixedly connected to the moving portion 12 of the carrier component 1 at the edge position away from the non-bent portion 21 of the flexible sample 2, and avoid the edge rising of the flexible sample 2 in the bending process. The second body adhesive fixing member 922 may be disposed between the edge position of the bent portion 22 of the flexible sample 2 away from the non-bent portion 21 of the flexible sample 2 and the edge position of the bent portion 22 of the flexible sample 2 adjacent to the non-bent portion 21 of the flexible sample 2. Compared with the structure in which an integral adhesive fixing member 9 is disposed to fix the bent portions 22 of the flexible sample 2, one bent portion 22 of the flexible sample 2 is fixed to the moving portion 12 of the carrier component 1 by at least two adhesive fixing members, which can leave the flexible sample 2 with more deformation margin during the bending process of the flexible sample 2 and is closer to the bending path of the flexible sample 2 in actual applications.

The adhesive fixing member 9 may be a double-sided adhesive or other adhesives for pasting and fixing. A length of each adhesive structure along the direction perpendicular to the first direction in the horizontal plane of the bending test device is equal to the length of a respective carrier plate, so as to improve the stability of fixing the flexible sample.

Referring to FIG. 7, a width D3 of the first body adhesive fixing member 921 for fixing the non-bent portion 21 of the flexible sample 2 along the first direction is greater than a width D4 of each of the edge adhesive fixing member 91 and the second body adhesive fixing member 922 for fixing the bent portion 22 of the flexible sample 2 along a direction perpendicular to the extension direction of the adhesive fixing member 9, so that the non-bent portion 21 of the flexible sample 2 is stably fixed to the horizontal fixed portion 11 of the carrier component 1.

It is to be noted that FIG. 7 only exemplarily illustrates the arrangement of the various adhesive structures when the carrier component is composed of carrier plates, and a similar arrangement of adhesive structures may be used when the carrier component is composed of the integral steel sheet.

As shown in FIG. 1, the bending test device 100 provided by this embodiment further includes the base 6 and a control component 7. The carrier component 1, the support component 3, the motor 4, the linkage components 5 and the control component 7 each are disposed on the base 6. A bending parameter of the moving portions 12 of the carrier component 1 relative to the horizontal fixed portion 11 of the carrier component 1 may be adjusted by manipulating the control component 7.

The base 6 supports and fixes the entire bending test device 100. The carrier component 1 and the control component 7 are disposed on the base 6. The bending parameter includes a bending speed, a bending radius, bending times and other parameters. The control component 7 may be an operation control panel. The control component 7 may set the bending parameter of the moving portions 12 of the carrier component 1, control the bending angle of the moving portions 12 of the carrier component 1 relative to the horizontal fixed portion 11 of the carrier component 1, making the bending radius adjustable and the bending times adjustable within a range of 0 to 0.99 million times. The control component 7 may be disposed at a middle position of the base 6 of the bending test device 100 for the flexible sample 2.

The bending test device provided by the embodiments of the present application can meet the bending test requirements of a flexible watch. The carrier component with the middle fixed and two ends movable is designed, achieving a consistent bending path of the bending test device and the terminal product. The carrier component is combined with the motor and the linkage components so that the automation of the bending test is implemented and the bending test can be continuously repeated 0.99 million times. The control component sets the bending angle and thus the bending radius is adjustable, which not only meets the requirements of flexible watch customers but also provides a new test device for the bending tests of the subsequent flexible wearable products.

What is claimed is:

1. A bending test device, comprising:
   a base; and
   at least two carrier components disposed on the base, wherein each carrier component comprises:
   a horizontal fixed portion having a first predetermined set of dimensions and fixed in place to the base and
   two moving portions having a second predetermined set of dimensions and rotatably connected to two sides of the horizontal fixed portion respectively, each of the two moving portions is configured to rotate freely relative to the horizontal fixed portion, the two sides of the horizontal fixed portion of each carrier component are both supported by a support plate, a flexible sample is fixed on each carrier component, each flexible sample comprises a non-bent portion and bent portions rotatably connected to two sides of the non-bent portion, the non-bent portion of each flexible sample is fixed to the horizontal fixed portion of each carrier component by a first body adhesive fixing member, and the bent portions of the flexible sample are fixed respectively on the two moving portions of each carrier component by both a second body adhesive fixing member and an edge adhesive fixing member;
   a support component vertically disposed on the base, wherein one end of the support component is connected to the horizontal fixed portion of each carrier component, the other end of the support component is connected to the base, each of the two moving portions of each carrier component is rotatable around a respective rotation shaft connected between the horizontal fixed portion and each of the two moving portions, and each of the two moving portions is configured to rotate on the respective rotation shaft to a side adjacent to the support component;
   a sample fixing member disposed on each carrier component, wherein the sample fixing member comprises a magnetic fixing member; and
   wherein the magnetic fixing member is separately disposed on surfaces of the horizontal fixed portion and the moving portions of each carrier component facing towards the support component and surfaces of the non-bent portion and the bent portions of the flexible sample facing away from each carrier component.

2. The bending test device of claim 1, wherein a height of the support component along a second direction is greater than a length of each of the two moving portions of each carrier component along a first direction, the first direction is in a horizontal plane of the bending test device and perpendicular to the respective rotation shaft connected between the horizontal fixed portion and each of the two moving portions, and the second direction is perpendicular to the horizontal plane of the bending test device.

3. The bending test device of claim 1, wherein a width of the support component along the first direction is less than a width of the horizontal fixed portion along the first direction.

4. The bending test device of claim 1, wherein the support component further comprises:
a fixing component fixedly connected to the support plate and each carrier component.

5. The bending test device of claim 4, wherein the horizontal fixed portions of the at least two carrier components are both disposed at an upper end of the support plate, the support plate is configured to support the horizontal fixed portions of the at least two carrier components, and the fixing component is configured to fix the horizontal fixed portions of the at least two carrier components to the support component.

6. The bending test device of claim 1, wherein the sample fixing member comprises:
a body adhesive fixing member, wherein the body adhesive fixing member comprises the first body adhesive fixing member and the second body adhesive fixing member; and
the edge adhesive fixing member.

7. The bending test device of claim 6, wherein a first position of each of the bent portions of the flexible sample is adhered to a respective one of the two moving portions of each carrier component by the edge adhesive fixing member, a second position of each of the bent portions of the flexible sample is adhered to the respective one of the two moving portions of each carrier component by the second body adhesive fixing member, the first position is close to an edge of each of the bent portions of the flexible sample, and the second position is close to the non-bent portion of the flexible sample.

8. The bending test device of claim 6, wherein a width of the first body adhesive fixing member along a first direction is greater than a width of the edge adhesive fixing member along the first direction, and the width of the first body adhesive fixing member along the first direction is greater than a width of the second body adhesive fixing member along the first direction.

9. The bending test device of claim 1, further comprising:
a motor and linkage components connected to the motor, wherein each of the linkage components is fixedly connected to a respective one of the two moving portions of each carrier component, each of the linkage components is configured to be driven by the motor to rotate around an axis of an output shaft of the motor, and each of the two moving portions of each carrier component is configured to be driven by a respective one of the linkage components to turn up and down around a respective rotation shaft connected between each of the two moving portions and the horizontal fixed portion.

10. The bending test device of claim 9, further comprising:
a control panel, wherein the control panel, each carrier component, the motor, and the linkage components are respectively disposed on the base, and the control panel is configured to adjust bending of the two moving portions of each carrier component relative to the horizontal fixed portion of each carrier component.

11. The bending test device of claim 10, wherein the control panel is further configured to, according to bending parameters, adjust a bending angle and bending times of the two moving portions of each carrier component relative to the horizontal fixed portion of each carrier component, and the bending parameters comprise a bending speed, a bending radius, and the bending times.

12. The bending test device of claim 10, wherein the control panel is disposed at a middle position of the base of the bending test device.

13. The bending test device of claim 1, wherein the horizontal fixed portion of each carrier component comprises a first carrier plate configured to carry a non-bent portion of a flexible sample, each of the two moving portions of each carrier component comprises a second carrier plate configured to carry a bent portion of the flexible sample, and the second carrier plate is rotatably connected to the first carrier plate.

14. The bending test device of claim 13, wherein the first carrier plate is made of an aluminum alloy material, the second carrier plate is made of an aluminum alloy material, surfaces of the first carrier plate are galvanized, and surfaces of the second carrier plate are galvanized.

15. The bending test device of claim 1, wherein each carrier component has an integral sheet structure, a middle portion of the integral sheet structure is used as the horizontal fixed portion of each carrier component, and two sides, except for the middle portion, of the integral sheet structure are used as the two moving portions to turn up and down.

* * * * *